United States Patent
Morinaga et al.

(10) Patent No.: US 8,439,139 B2
(45) Date of Patent: May 14, 2013

(54) METHOD OF CONTROLLING HYBRID CONSTRUCTION MACHINE AND HYBRID CONSTRUCTION MACHINE

(75) Inventors: Jun Morinaga, Yokohama (JP); Tadashi Kawaguchi, Hiratsuka (JP); Hiroaki Inoue, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 606 days.

(21) Appl. No.: 12/450,444

(22) PCT Filed: Mar. 27, 2008

(86) PCT No.: PCT/JP2008/055920
§ 371 (c)(1),
(2), (4) Date: Sep. 25, 2009

(87) PCT Pub. No.: WO2008/123368
PCT Pub. Date: Oct. 16, 2008

(65) Prior Publication Data
US 2010/0071973 A1    Mar. 25, 2010

(30) Foreign Application Priority Data
Mar. 28, 2007 (JP) .................................. 2007-084493

(51) Int. Cl.
*B60W 10/00*    (2006.01)

(52) U.S. Cl.
USPC .................. 180/65.265; 180/65.285

(58) Field of Classification Search .................. 180/65.1, 180/65.265, 65.285, 65.275, 65.21; 318/432, 318/139, 376, 140; 320/104, 132
See application file for complete search history.

(56) References Cited

U.S. PATENT DOCUMENTS

| | | | | |
|---|---|---|---|---|
| 5,412,293 A | * | 5/1995 | Minezawa et al. | 318/376 |
| 6,635,973 B1 | * | 10/2003 | Kagoshima et al. | 318/139 |
| 6,864,663 B2 | * | 3/2005 | Komiyama et al. | 320/104 |
| 7,378,808 B2 | * | 5/2008 | Kuras et al. | 318/139 |
| 7,816,804 B2 | * | 10/2010 | Soma et al. | 307/10.1 |
| 2004/0148817 A1 | | 8/2004 | Kagoshima et al. | |
| 2007/0158118 A1 | * | 7/2007 | King | 180/65.1 |
| 2007/0229009 A1 | * | 10/2007 | Egami et al. | 318/432 |

FOREIGN PATENT DOCUMENTS

| | | |
|---|---|---|
| JP | 2002-325379 | 11/2002 |
| JP | 2003-028071 | 1/2003 |
| JP | 2005-045883 | 2/2005 |
| JP | 2005-155251 | 6/2005 |
| JP | 2007-191973 | 8/2007 |

OTHER PUBLICATIONS

International Search Report issued in PCT/JP2008/055920, dated Jun. 10, 2008.
Written Opinion issued in PCT/JP2008/055920, dated Jun. 10, 2008.

\* cited by examiner

*Primary Examiner* — Hau Phan
(74) *Attorney, Agent, or Firm* — Edwards Wildman Palmer LLP (57) ABSTRACT

A method of controlling a hybrid construction machine capable of preventing a system from being rendered inoperative without increasing a capacitance of a capacitor and of inhibiting delay of a swing operation relative to an operation command at the time of swing operation, and the hybrid construction machine are provided. For this purpose, at the time of discharge of the capacitor, actual torque command values are respectively generated by referring to an assist torque limit value corresponding to capacitor voltage of a generator motor and a swing power running torque limit value corresponding to the capacitor voltage of a swing motor, as well as, at the time of charge of the capacitor, an actual target output value of the generator motor is generated.

11 Claims, 11 Drawing Sheets

METHOD OF CONTROLLING HYBRID CONSTRUCTION MACHINE AND HYBRID CONSTRUCTION MACHINE

TECHNICAL FIELD

The present invention relates to a control method of a hybrid construction machine provided with an engine and a generator motor coupled to each other as drive sources and with a swing motor for swinging a part of a body relative to other parts, and the hybrid construction machine.

BACKGROUND ART

Conventionally, in a hybrid vehicle having an engine and a generator motor coupled to each other as the drive sources, a capacitor may be used as a power storage device for exchanging electric power with the generator motor. Voltage of the capacitor gradually decreases due to continuous operation. Therefore, when the voltage of the capacitor becomes lower than operable voltage of the capacitor, the system is rendered inoperative.

As one method of solving the above-described problem to prevent the system from being inoperative, capacitance of the capacitor may be increased. However, when the capacitance of the capacitance is increased, the capacitor size is increased and there may be a problem of weight, a mounting space, and a cost thereof might occur.

Then, as a technique to prevent the system from being rendered inoperative without increasing the capacitance of the capacitor, a technique to limit an output of a voltage converter for converting electric power of the capacitor to electric power having low potential when a power storage amount of the capacitor becomes lower than a predetermined threshold during engine stop is disclosed (for example, refer to Patent Document 1).

Patent Document 1: Japanese Laid-Open Patent Application Publication No. 2005-45883

DISCLOSURE OF INVENTION

Problem to be Solved by the Invention

However, when applying the technique disclosed in the above-described Patent Document 1 to the hybrid construction machine, which is one example of the hybrid vehicle, there has been a problem that a swing operation is delayed relative to an operation command input by an operator at the time of swing operation.

The present invention is made in consideration of the above-described circumstances, and an object thereof is to provide a method of controlling the hybrid construction machine capable of preventing the system from being rendered inoperative without increasing the capacitance of the capacitor and of inhibiting the delay of the swing operation relative to the operation command at the time of the swing operation, and the hybrid construction machine.

Means for Solving Problem

According to an aspect of the present invention, a method of controlling a hybrid construction machine provided with an engine and a generator motor coupled to each other, a swing motor which electric power is supplied to from the generator motor for swinging a part of a body relative to other parts, a capacitor for storing the electric power generated by the generator motor and the swing motor and supplying the electric power to the generator motor and the swing motor, and a booster for boosting voltage of the capacitor to output, includes: an assist torque limit value calculating step of calculating an assist torque limit value of the generator motor corresponding to capacitor voltage of the capacitor when the booster performs an output associated with discharge of the capacitor; a generator motor torque command value calculating step of calculating a torque command value of the generator motor according to a target speed of the generator motor; and a generator motor actual torque command value generating step of comparing the assist torque limit value calculated at the assist torque limit value calculating step with the torque command value calculated at the generator motor torque command value calculating step, and generating an actual torque command value of the generator motor by using a smaller of the assist torque limit value and the torque command value.

Advantageously, in the method of controlling the hybrid construction machine, the assist torque limit value is zero when the capacitor voltage is not larger than a first threshold, and gradually increases as the capacitor voltage becomes larger than the first threshold to take a constant value when the capacitor voltage is not smaller than a second threshold larger than the first threshold.

Advantageously, in the method of controlling the hybrid construction machine, in the generator motor torque command value calculating step, the torque command value of the generator motor is calculated by performing proportional control, in which an actual speed of the generator motor is fed back.

Advantageously, the method of controlling the hybrid construction machine further includes: a swing power running torque limit value calculating step of calculating a swing power running torque limit value of the swing motor corresponding to the capacitor voltage when the booster performs the output associated with the discharge of the capacitor; a swing motor torque command value calculating step of calculating a torque command value of the swing motor according to a target speed of the swing motor; and a swing motor actual torque command value generating step of comparing the swing power running torque limit value calculated at the swing power running torque limit value calculating step with the torque command value calculated at the swing motor torque command value calculating step and generating an actual torque command value of the swing motor by using a smaller of the swing power running torque limit value and the torque command value.

Advantageously, in the method of controlling the hybrid construction machine, the swing power running torque command value is zero when the capacitor voltage is not larger than a third threshold, which is smaller than the first threshold, and gradually increases as the capacitor voltage becomes larger than the third threshold to take a constant value when the capacitor voltage is not smaller than a fourth threshold, which is larger than the third threshold.

Advantageously, in the method of controlling the hybrid construction machine, in the swing motor torque command value calculating step, the torque command value of the swing motor is calculated by performing proportional control, in which an actual speed of the swing motor is fed back.

Advantageously, the method of controlling the hybrid construction machine further includes: a booster output limit value calculating step of calculating an output limit value of the booster corresponding to the capacitor voltage when the booster performs an output associated with charge of the capacitor; a generator motor output limit value calculating step of calculating an output limit value of the generator motor by using the output limit value calculated at the booster output limit value calculating step and an output of the swing motor; an actual target output value generating step of comparing the output limit value of the generator motor calculated at the generator motor output limit value calculating step and a target output value of the generator motor and generating an actual target output value of the generator motor by using a smaller of the output limit value of the generator motor and a target output value of the generator motor; and a charge time generator motor actual torque command value generating step of generating the actual torque command value of the generator motor by using the actual target output value generated at the actual target output value generating step and a motor speed of the generator motor.

According to another aspect of the present invention, a hybrid construction machine provided with an engine and a generator motor coupled to each other, a swing motor which electric power is supplied to from the generator motor for swinging a part of a body relative to other parts, a capacitor for storing the electric power generated by the generator motor and the swing motor and supplying the electric power to the generator motor and the swing motor, and a booster for boosting voltage of the capacitor to output, includes: a capacitor voltage measuring unit for successively measuring capacitor voltage of the capacitor; and a controlling unit for calculating an assist torque limit value of the generator motor corresponding to the capacitor voltage measured by the capacitor voltage measuring unit, while calculating a torque command value of the generator motor according to a target speed of the generator motor, and for comparing the assist torque limit value and the torque command value of the generator motor, and generating an actual torque command value of the generator motor to output by using a smaller of the assist torque limit value and the torque command value of the generator motor, when the booster performs an output associated with discharge of the capacitor.

Advantageously, in the hybrid construction machine, the controlling unit, while calculating a swing power running torque limit value of the swing motor corresponding to the capacitor voltage measured by the capacitor voltage measuring unit, calculates a torque command value of the swing motor according to a target speed of the swing motor, compares the swing power running torque limit value and the torque command value of the swing motor, and generates an actual torque command of the swing motor to output by using a smaller of the swing power running torque limit value and the torque command value of the swing motor, when the booster performs the output associated with the discharge of the capacitor.

Advantageously, in the hybrid construction machine, the controlling unit calculates an output limit value of the booster corresponding to the capacitor voltage measured by the capacitor voltage measuring unit, obtains an output limit value of the generator motor by using the calculated output limit value and the output of the swing motor, compares the output limit value and a target output value of the generator motor, and generates an actual target output value of the generator motor to output by using a smaller of the output limit value and a target output value of the generator motor, when the booster performs an output associated with charge of the capacitor.

Effect of the Invention

According to the present invention, while the actual torque command values are generated by referring to the torque limit value corresponding to the capacitor voltage of the generator motor and of the swing motor respectively at the time of discharge of the capacitor, the actual target output value of the generator motor is generated at the time of charge of the capacitor, so that it is possible to prevent the system from being rendered inoperative without increasing the capacitance of the capacitor. Also, while the actual torque command value (at the time of discharge of the capacitor) and the actual target output value (at the time of charge of the capacitor) of the generator motor are obtained in view of the output limit of the booster corresponding to the capacitor voltage, the effect of the booster is little in the swing motor, so that the delay of the swing operation relative to the operation command by the operator at the time of swing operation may be inhibited.

EXPLANATIONS OF LETTERS OR NUMERALS 1 hydraulic shovel
2 engine
3 generator motor
4 hydraulic pump
5 inverter
6 capacitor
7 voltage sensor
8 booster
9 swing motor
10 swing inverter
11 swing machinery
12 controller
12a memory
13 operation input unit
21 boom operation valve
22 arm operation valve 23 bucket operation valve
24 left running operation valve
25 right running operation valve
31 boom hydraulic cylinder
32 arm hydraulic cylinder
33 bucket hydraulic cylinder
34 left running hydraulic cylinder
35 right running hydraulic cylinder
101 running body
102 swing body
103 boom
104 arm
105 bucket

BEST MODE(S) FOR CARRYING OUT THE INVENTION

Figure 1:
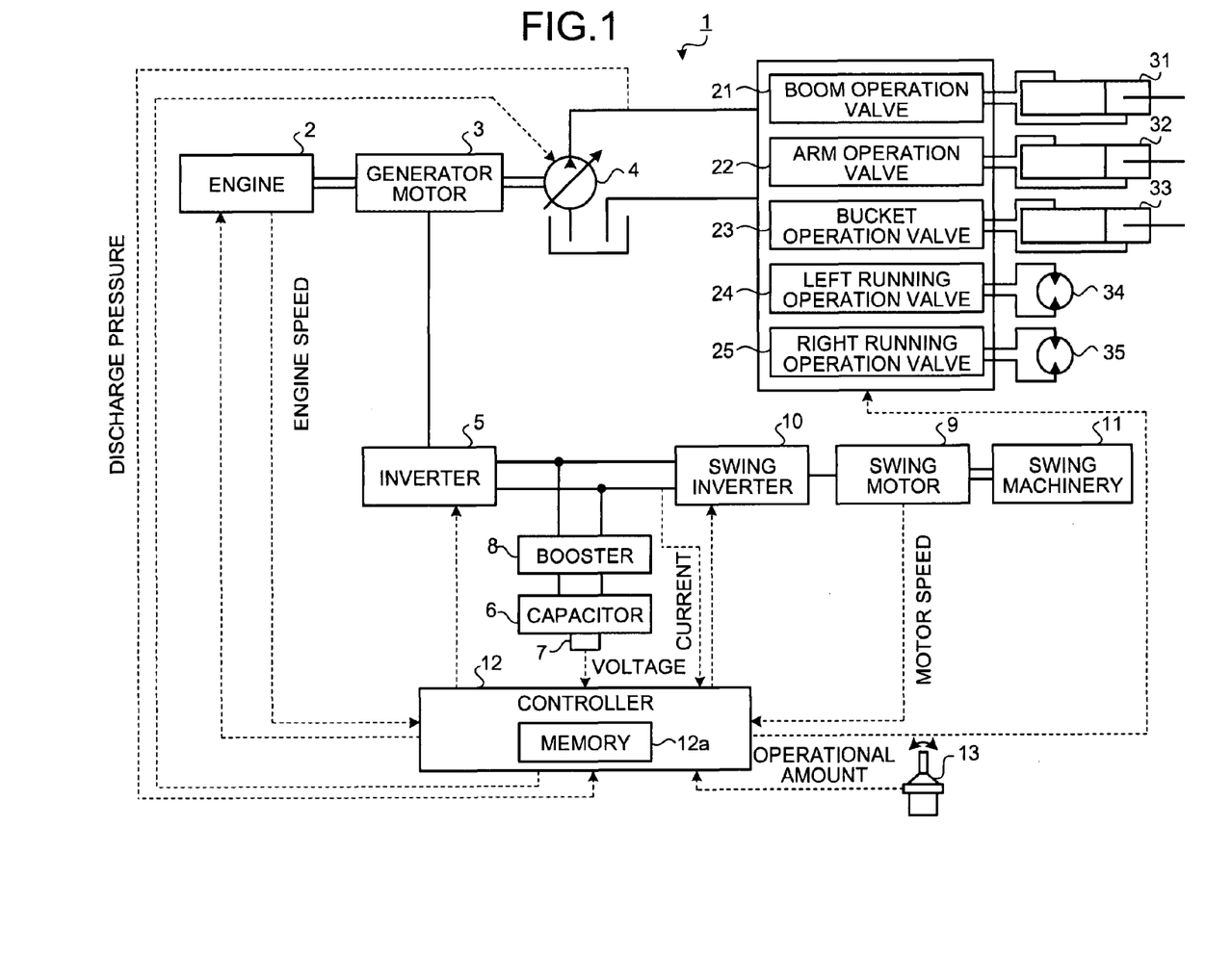
FIG. 1 is a view showing a configuration of a substantial part of a hybrid construction machine according to one embodiment of the present invention.

Hereinafter, a best mode for carrying out the present invention (hereinafter, referred to as an "embodiment") is described with reference to attached drawings. FIG. 1 is a view showing a configuration of a substantial part of a hybrid construction machine according to one embodiment of the present invention. The hybrid construction machine according to this embodiment is provided with an engine and a generator motor coupled to each other as drive sources, and has an electric swing function to swing a part of a body relative to other parts. Although a case of a hydraulic shovel having an excavation function is used as the hybrid construction machine is described in this embodiment, this is no more than one example.

Figure 2:
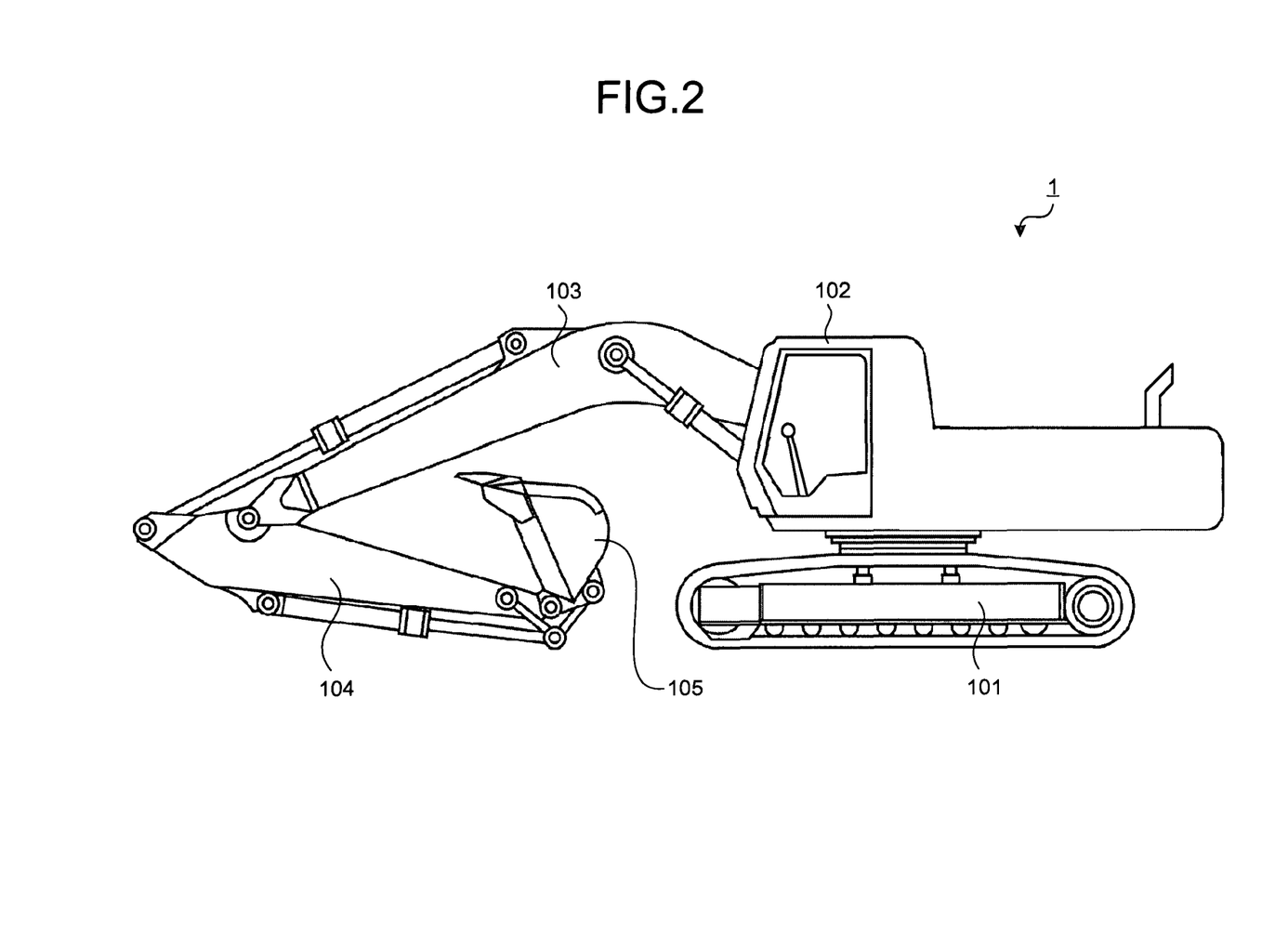
FIG. 2 is a view showing an external configuration of the hybrid construction machine according to one embodiment of the present invention.

FIG. 2 is a view showing an external configuration of the hydraulic shovel, which is the hybrid construction machine. A hydraulic shovel 1 shown in the drawing is provided with a running body 101 having a right-and-left pair of crawler tracks, and a swing body 102 located above the running body 101 and swingable about a swing axis oriented in a predetermined direction relative to the running body 101. In addition, the hydraulic shovel 1 has an operating machine for excavating composed of a boom 103, an arm 104 and a bucket 105. Out of them, the boom 103 is connected so as to be rotatable in an up and down direction relative to the running body 101.

Next, an internal configuration of a hydraulic shovel 1 is described with reference to FIG. 1. The hydraulic shovel 1 includes an engine 2, which is a drive source, a generator motor 3 and a hydraulic pump 4 each having a drive shaft coupled to an output shaft of the engine 2, an inverter 5 connected to the generator motor 3 for driving the generator motor 3, a capacitor 6 for storing electric power generated by the generator motor 3 and supplying the electric power to the generator motor 3, a voltage sensor 7 for successively measuring voltage of the capacitor 6 (capacitor voltage measuring means), and a booster 8 connected in parallel to the inverter 5 and the capacitor 6 for boosting the voltage of the capacitor 6 to output to the inverter 5.

Also, the hydraulic shovel 1 is provided with a swing motor 9, which is the drive source for swinging the swing body 102, a swing inverter 10 connected in parallel to the capacitor 6 and connected in parallel to the inverter 5 for driving the swing motor 9, and swing machinery 11 coupled to a drive axis of the swing motor 9 for swinging the swing body 102.

Further, the hydraulic shovel 1 is provided with a controller 12 for electronically controlling the engine 2, the hydraulic pump 4, the inverter 5 and the swing inverter 10, and an operation input unit 13 composed of an operating lever or the like for an operator to input desired operation.

The generator motor 3 is realized by, for example, a switched reluctance (SR) motor or a permanent magnet (PM) motor. Also, a swing motor 9 is realized by, for example, the PM motor.

The hydraulic pump 4 is connected to various operation valves such as an boom operation valve 21, an arm operation valve 22, an bucket operation valve 23, a left running operation valve 24, and a right running operation valve 25, through piping. The hydraulic pump 4 is a variable displacement type, and capacity thereof changes due to a change in tilt angle of a tilted plate.

Pressurized oil discharged from the hydraulic pump 4 is supplied to a boom hydraulic cylinder 31, a arm hydraulic cylinder 32, a bucket hydraulic cylinder 33, a left running hydraulic cylinder 34 and a right running hydraulic cylinder 35, which serve as actuators, through the boom operation valve 21, the arm operation valve 22, the bucket operation valve 23, the left running operation valve 24, and the right running operation valve 25, respectively. This allows the boom 103, the arm 104, the bucket 105, the left crawler track and the right crawler track to operate.

Figure 3:
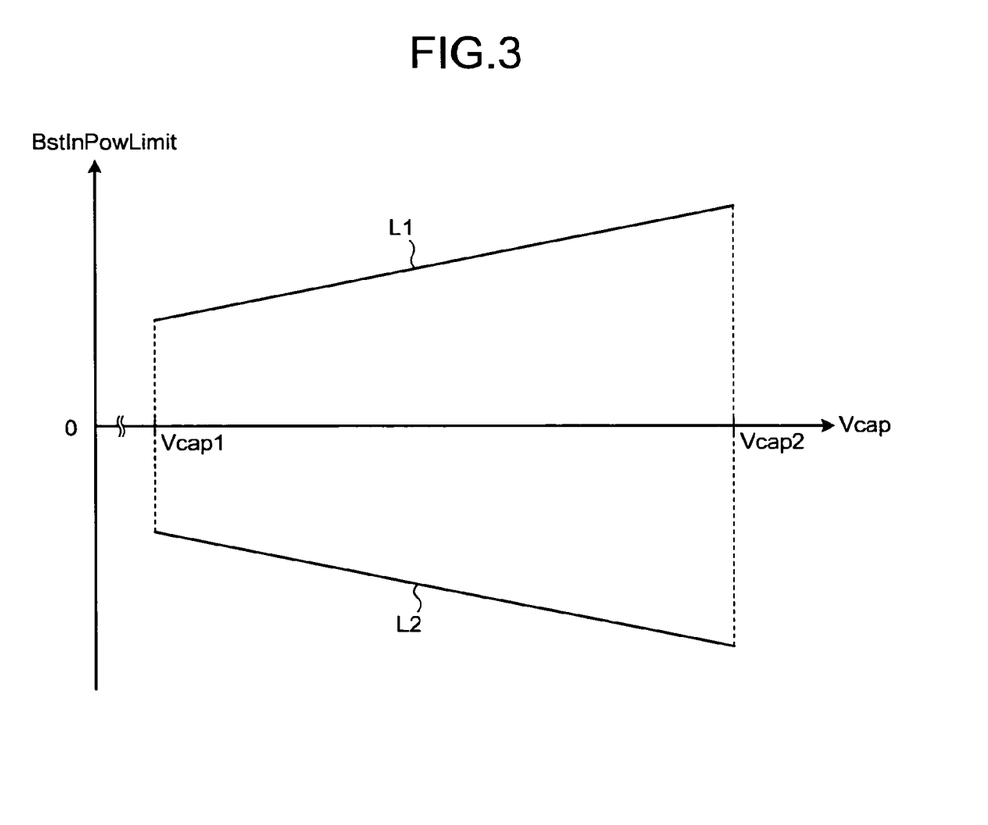
FIG. 3 is a view showing an operating characteristic of a booster included in the hybrid construction machine according to one embodiment of the present invention.

FIG. 3 is a view showing an operating characteristic of the booster 8, and specifically is the view showing an output limit value BstInPowLimit of the booster 8, which may be output according to capacitor voltage Vcap. In FIG. 3, a curve L1 on a positive side represents the output limit value at the time of discharge (power running) of the capacitor 6 and a curve L2 on a negative side represents the output limit value at the time of charge (regeneration) of the capacitor 6. In addition, in FIG. 3, a range on an abscissa axis Vcap1 to Vcap2 corresponds to an operating voltage range in which the capacitor 6 may offer performance thereof. As is clear from the curves L1 and L2 shown in FIG. 3, the larger the capacitor voltage Vcap is, the larger an absolute value of the output limit value of the booster 8 is.

A controller 12, which is at least a part of controlling means, receives an input of an engine speed of the engine 2, discharge pressure of the hydraulic pump 4, the voltage of the capacitor 6, direct-current electricity to be input to a swing inverter 10 (with a reversed sign at the time of output), a motor speed of the swing motor 9, an operational amount of an operation input unit 13 by the operator, and the like, each measured by predetermined measuring means, and drive-controls the hydraulic shovel 1 based on the input of various measured values. Meanwhile, the various measured values are successively measured substantially in real time. A controller 12 has a memory 12a for storing a program for controlling various operations of the hydraulic shovel 1, various calculated results, and the like.

Next, a method of controlling the hydraulic shovel 1 having the above-described configuration is described. First, an operation at the time of discharge of the capacitor 6 is described. At the time of discharge of the capacitor, control according to the capacitor voltage Vcap is performed in each of the generator motor 3 and the swing motor 9.

Figure 4:
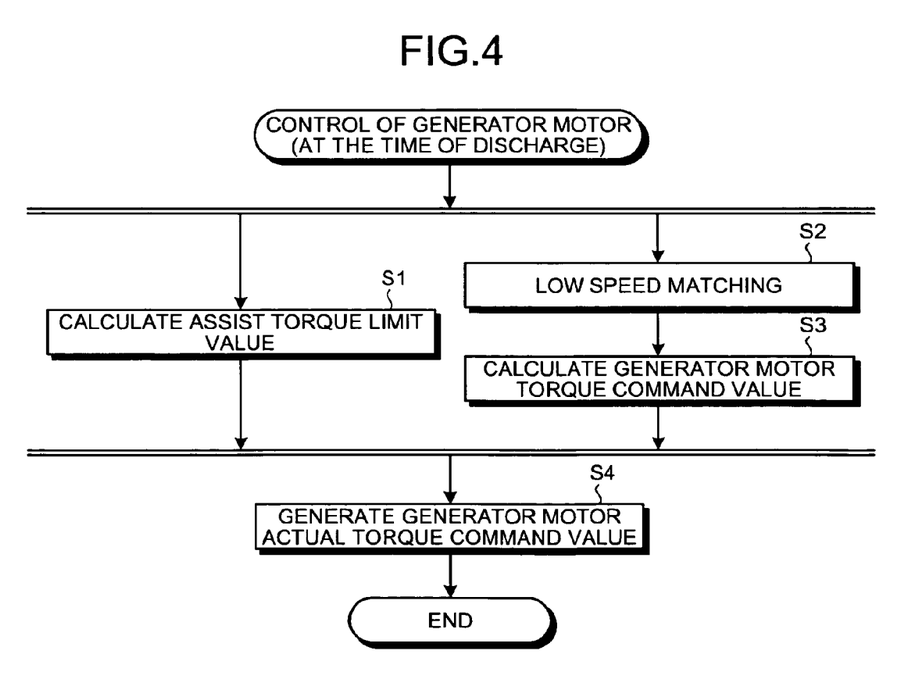
FIG. 4 is a flowchart showing an overview of control of a generator motor at the time of discharge of a capacitor in a method of controlling the hybrid construction machine according to one embodiment of the present invention.
Figure 5:
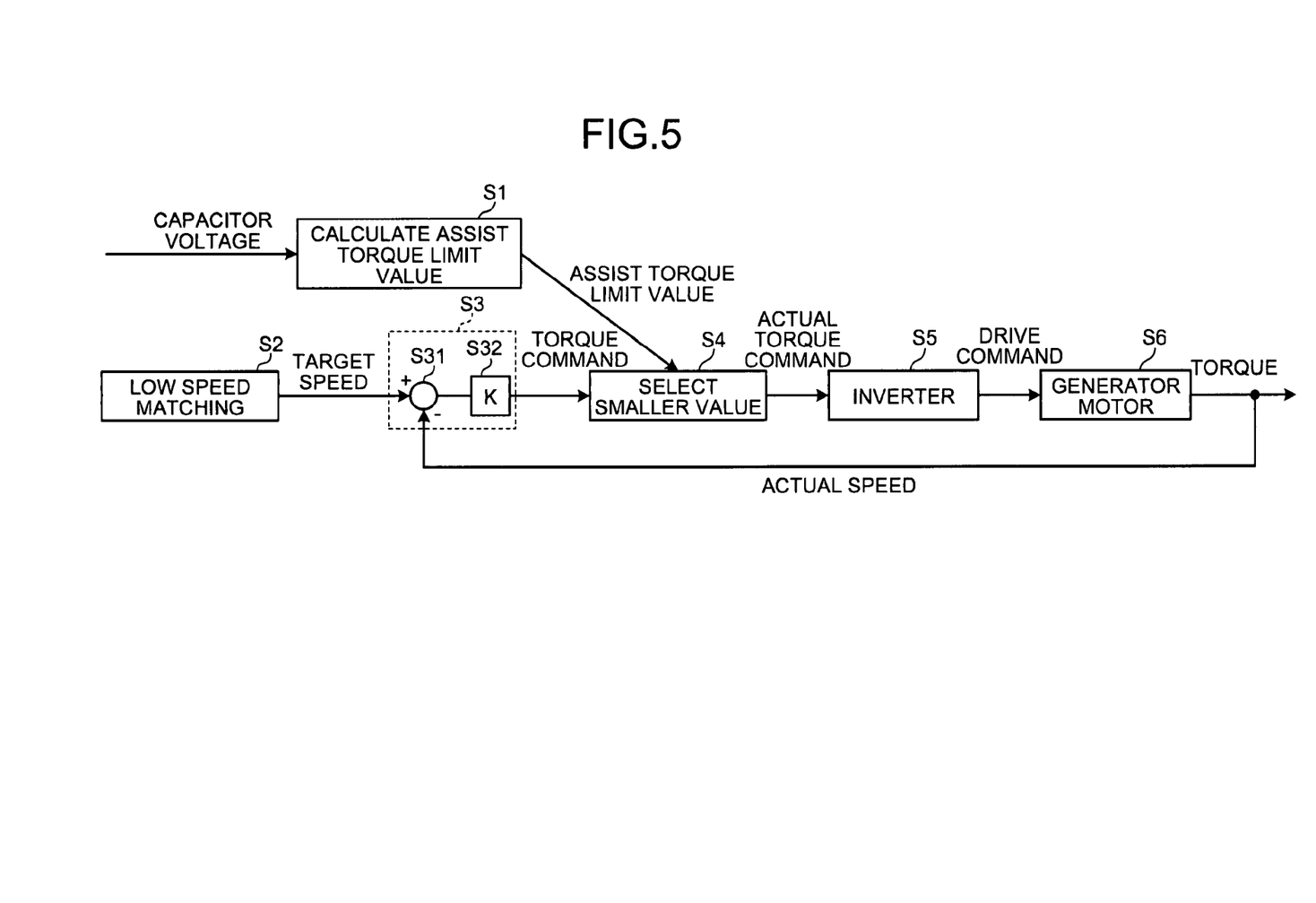
FIG. 5 is a process flow diagram showing the flowchart shown in FIG. 4 in more detail based on flow of signals.

FIG. 4 is a flowchart showing an overview of the control of the generator motor 3 at the time of discharge of the capacitor. In addition, FIG. 5 is a process flow diagram showing the flowchart shown in FIG. 4 in more detail based on flow of signals.

Figure 6:
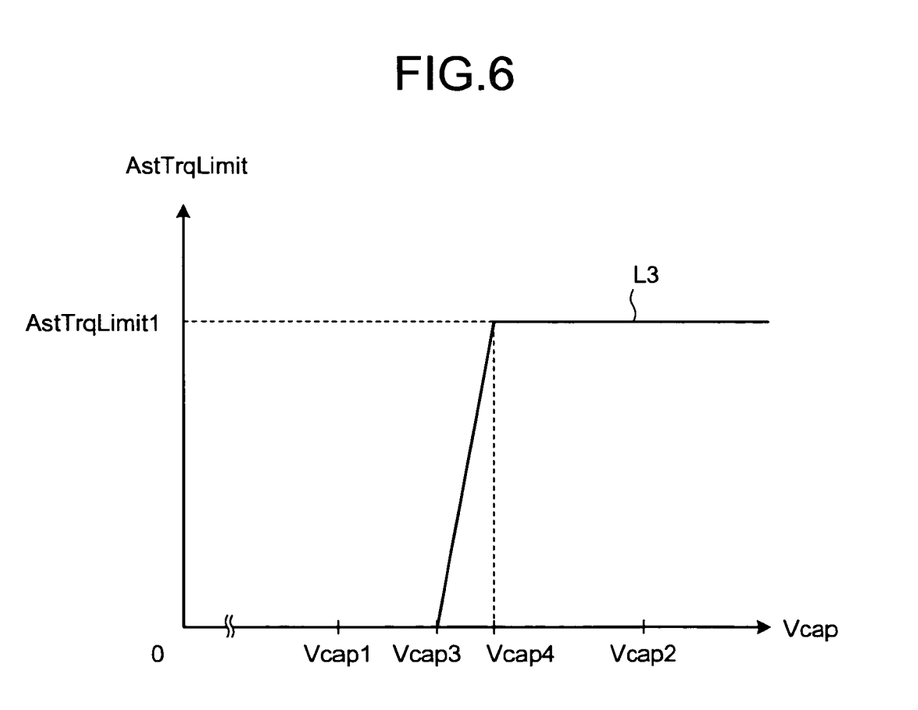
FIG. 6 is a view showing a relationship between capacitor voltage and an assist torque limit value of the generator motor.

First, the controller 12 calculates a limit value of assist torque corresponding to the capacitor voltage Vcap of the capacitor 6 measured by the voltage sensor 7 (step S1). FIG. 6 is a view showing a relationship between the capacitor voltage Vcap and an assist torque limit value AstTrqLimit of the generator motor 3, to which the controller 12 refers at the step S1. A curve L3 shown in the view represents a value zero when the capacitor voltage Vcap is not larger than a first threshold Vcap3, and the value gradually increases as the capacitor voltage Vcap becomes larger than the first threshold Vcap3 to take a constant value AstTrqLimit1 when the capacitor voltage Vcap is not smaller than a second threshold Vcap 4.

Herein, the first threshold Vcap 3 is included in the operating voltage range Vap1 to Vcap2 of the capacitor voltage Vcap and is larger than Vcap1. Also, the second threshold Vap4 is larger than the first threshold Vcap3 and is included in the operating voltage range Vcap1 to Vcap2 of the capacitor voltage Vcap.

Meanwhile, in FIG. 6, although the assist torque limit value AstTrqLimit linearly increases with increasing capacitor voltage Vcap when the capacitor voltage Vcap satisfies Vcap3<Vcap<Vcap4, this is no more than one example. That is to say, it is not necessary that the assist torque limit value AstTrqLimit increases linearly with increasing capacitor voltage Vcap as long as it increases monotonously.

In parallel with the above-described process, the controller 12 performs matching (low speed matching) between an output of the engine 2 and pump absorption horsepower of the hydraulic pump 4 in a low speed range in which the engine speed of the engine 2 is smaller than a predetermined set speed to output a target speed (target rotational number) of the generator motor 3, in order to increase efficiency of the hydraulic pump 4 and to reduce fuel consumption (amount of fuel consumed per unit time and per unit output), that is to say, to improve the fuel consumption (step S2).

After that, the controller 12 calculates a torque command value of the generator motor 3 (step S3). When calculating the torque command value, the controller 12 calculates difference between the target speed output by the low speed matching and an actual measured value of the speed of the generator motor 3 (step S31), and converts the calculated difference to a torque command value of the assist torque to be applied to the output shaft of the engine 2 by multiplying the calculated difference by a predetermined proportional constant (step S32).

Next, the controller 12 reads the assist torque limit value output at the step S1 and the torque command value output at the step S3 from the memory 12a to compare with each other, selects a smaller value to generate an actual torque command value, and outputs the actual torque command value (step S4).

The inverter 5, which has received an input of the actual torque command value from the controller 12, outputs a drive command to the generator motor 3 according to the actual torque command value (step S5). The generator motor 3 drives based on the drive command output by the inverter 5 to generate torque (step S6). An actual speed (actual motor speed) of the generator motor 3 is successively measured by a predetermined speed sensor and is fed back to the above-described step S3 (S31).

In this manner, in this embodiment, when controlling the assist torque of the generator motor 3, the torque command value generated by performing proportional control, in which the actual speed of the generator motor 3 is fed back, and the assist torque limit value of the generator motor 3 corresponding to the curve L3 in FIG. 6 and obtained by referring to a conversion table (stored in the memory 12a) stored in the memory 12a are compared with each other, and a smaller value is adopted as the actual torque command value. As a result, it is possible to start reducing assist operation of the generator motor 3 when the capacitor voltage Vcap becomes smaller than the second threshold Vcap 4, and to stop the assist operation of the generator motor 3 when the capacitor voltage Vcap becomes smaller than the first threshold Vcap3, so that it becomes possible to surely prevent the system from being rendered inoperative.

Figure 7:
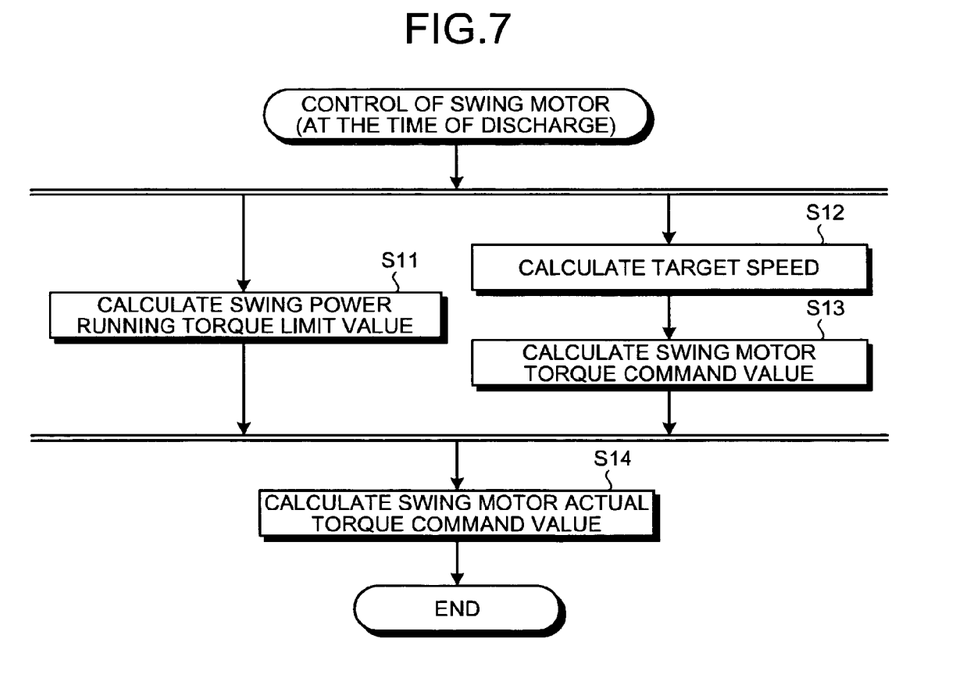
FIG. 7 is a flowchart showing an overview of control of a swing motor at the time of discharge of the capacitor in the method of controlling the hybrid construction machine according to one embodiment of the present invention.
Figure 8:
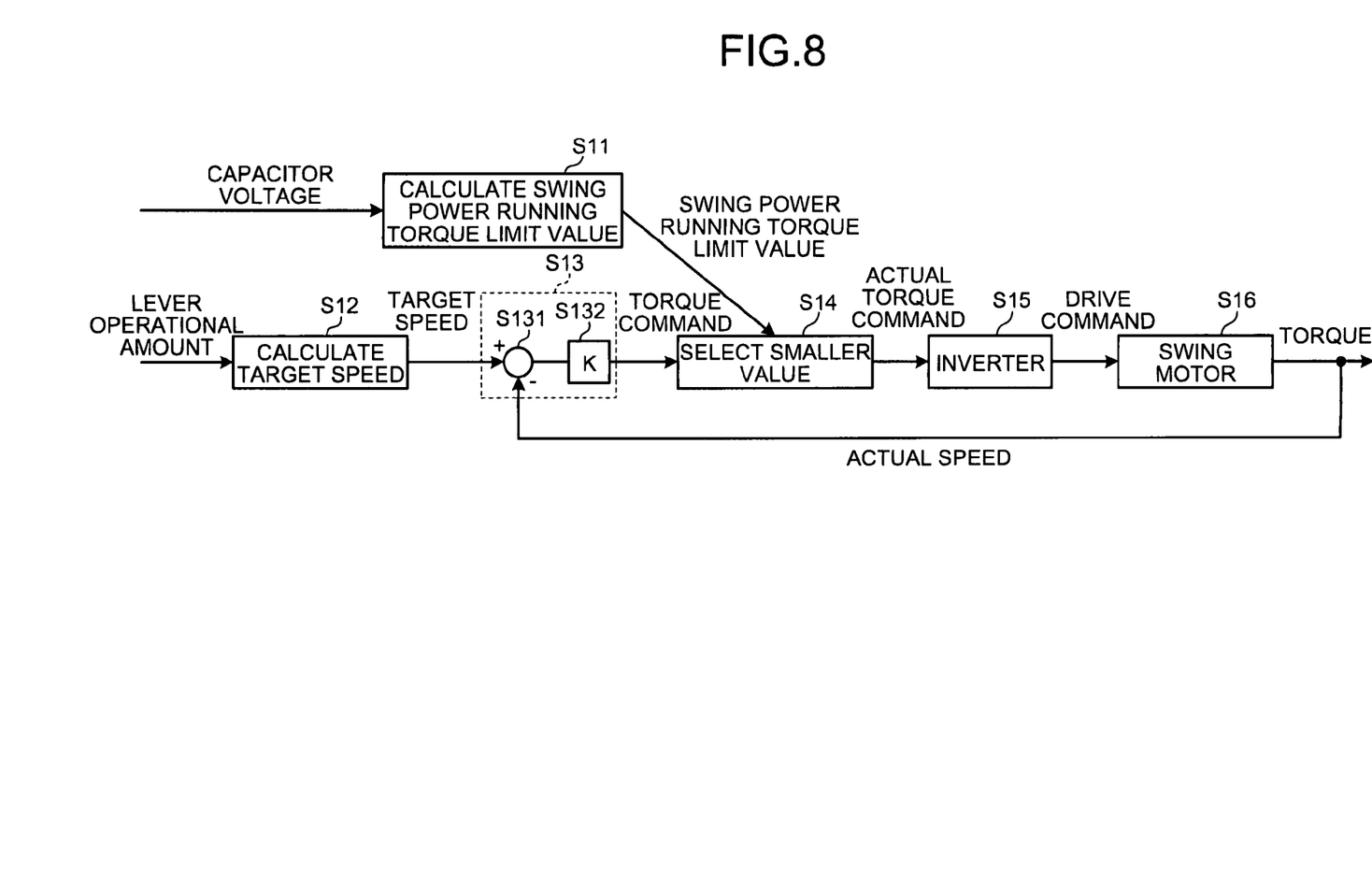
FIG. 8 is a process flow diagram showing the flowchart shown in FIG. 7 in more detail based on flow of signals.

FIG. 7 is a flowchart showing an overview of control of the swing motor 9 performed in parallel with the control at the generator motor 3 side at the time of discharge of the capacitor. Also, FIG. 8 is a process flow diagram showing the flowchart shown in FIG. 7 in more detail based on flow of signals.

The controller 12 calculates a swing power running torque limit value corresponding to the capacitor voltage Vcap of the capacitor 6 measured by the voltage sensor 7 to output (step S11).

Figure 9:
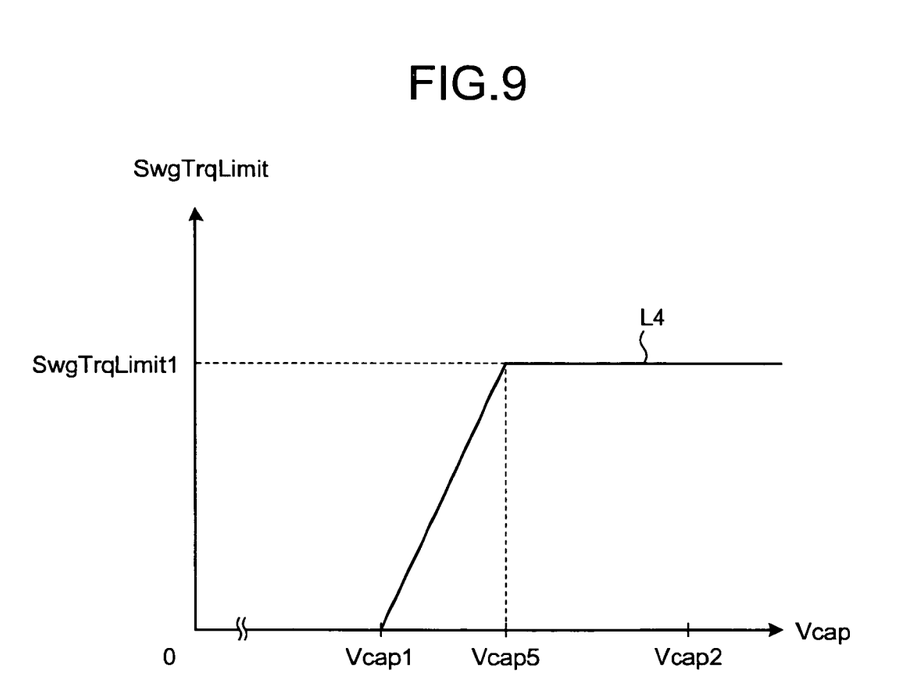
FIG. 9 is a view showing a relationship between the capacitor voltage and a swing power running torque limit value of the swing motor.

FIG. 9 is a view showing a relationship between the capacitor voltage Vcap, which the controller 12 refers to at the step S11, and a swing power running torque limit value SwgTrqLimit of the swing motor 9. A curve L4 shown in the view represents a value zero when the capacitor voltage Vcap is not larger than a third threshold Vcap1, and the value gradually increases as the capacitor voltage Vcap becomes larger than the third threshold Vcap1 to take a constant value SwgTrqLimit1 when the capacitor voltage Vcap is not smaller than a fourth threshold value Vcap 5.

Herein, the third threshold Vcap1 is nothing more or less than a lower limit value of the operating voltage range of the capacitor voltage Vcap. In addition, a fourth threshold Vcap5 is larger than the third threshold Vcap1 and is included in the operating voltage range Vcap1 to Vcap2 of the capacitor voltage Vcap.

Meanwhile, in FIG. 9, although the swing power running torque limit value SwgTrqLimit linearly increases with increasing capacitor voltage Vcap when the capacitor voltage Vcap satisfies Vcap1<Vcap<Vcap5, this is no more than one example. That is to say, it is not necessary that the swing power running torque limit value SwgTrqLimit increases linearly with increasing capacitor voltage Vcap as long as it increases monotonously.

The controller 12 calculates the target speed according to the operational amount (lever stroke) when the operator operates the lever of the operation input unit 13 (step S12).

After that, the controller 12 calculates a torque command value of the swing motor (step S13). When calculating the torque command value, the controller 12 calculates difference between the target speed calculated at the step S12 and an actual speed of the swing motor 9 (step S131), and converts the calculated difference to a swing power running torque command value by multiplying the calculated difference by a predetermined proportional constant (step S132).

Subsequently, the controller 12 reads the swing power running torque limit value output at the step S11 and the torque command value output at the step S13 from the memory 12a to compare with each other, selects a smaller value to generate the actual torque command value, and outputs the actual torque command value (step S14).

The swing inverter 10, which has received an input of the actual torque command value from the controller 12, outputs a drive command to the swing motor 9 according to the actual torque command value (step S15). The swing motor 9 drives based on the drive command output by the swing inverter 10 to generate torque (step S16). The actual speed (actual rotational number) of the swing motor 9 is successively measured by a predetermined speed sensor and is fed back to the above-described step S13 (S131).

In this manner, when controlling the swing power running torque of the swing motor 9, the torque command value generated by performing the proportional control, in which the actual speed of the swing motor 9 is fed back, and the swing power running torque limit value of the swing motor 9 corresponding to the curve L4 in FIG. 9 and obtained by referring to the conversion table stored in the memory 12a are compared with each other, and a smaller value is adopted as the actual torque command. As a result, it is possible to start reducing the swing power running operation of the swing motor 9 when the capacitor voltage Vcap becomes smaller than the fourth threshold Vcap5, and to stop the swing power running operation of the swing motor 9 when the capacitor voltage Vcap becomes smaller than the third threshold Vcap1, so that it becomes possible to surely prevent the system from being rendered inoperative.

Meanwhile, in this embodiment, the booster 8 is provided between the capacitor 6, and the inverter 5 and the swing inverter 10. Therefore, when performing the above-described control, the control according to the operating characteristic of the booster 8 is required. Specifically, the booster 8 has the operating characteristic described with reference to FIG. 3, and the output limit value BstInPowLimit of the booster 8 follows the curve L1 in the control at the time of discharge of the capacitor. Therefore, in case in which an output of the booster 8 almost exceeds the limit according to the capacitor voltage Vcap, it is required to reduce the discharge of the capacitor 6.

In order to reduce the discharge of the capacitor 6, the torque of the generator motor 3 and that of the swing motor 9 are limited. In this case, if the process according to performance of the booster 8 is performed by the swing motor 9, the operator easily feels uncomfortable at the time of operation because the torque command value of the swing motor 9 is normally generated based on the operation by the operator, and this also affects an operation speed. On the other hand, change in the assist torque of the generator motor 3 is change of degree of increase in the engine speed, and thus this is hardly recognizable to the operator when compared to change in a swing speed of the swing body 102. In view of this, in this embodiment, the value of the threshold Vcap3, which causes the assist torque limit value of the generator motor 3 set to zero, is made larger than the threshold Vcap1 (=lower limit value of the operating voltage range of the capacitor 6), which causes the swing power running torque limit value of the swing motor 9 set to zero, so that the process to prevent the system from being rendered inoperative because of the output of the booster 8 exceeding the limit, is performed at the generator motor 3 side as much as possible.

Next, the method of controlling the hydraulic shovel 1 at the time of charge of the capacitor 6 is described. In this embodiment, as the control at the time of charge of the capacitor, in a case in which the output of the booster 8 (=input to the capacitor 6) is almost exceeds the upper limit value, an output of the generator motor 3 is controlled to prevent the system from being rendered inoperative.

Figure 10:
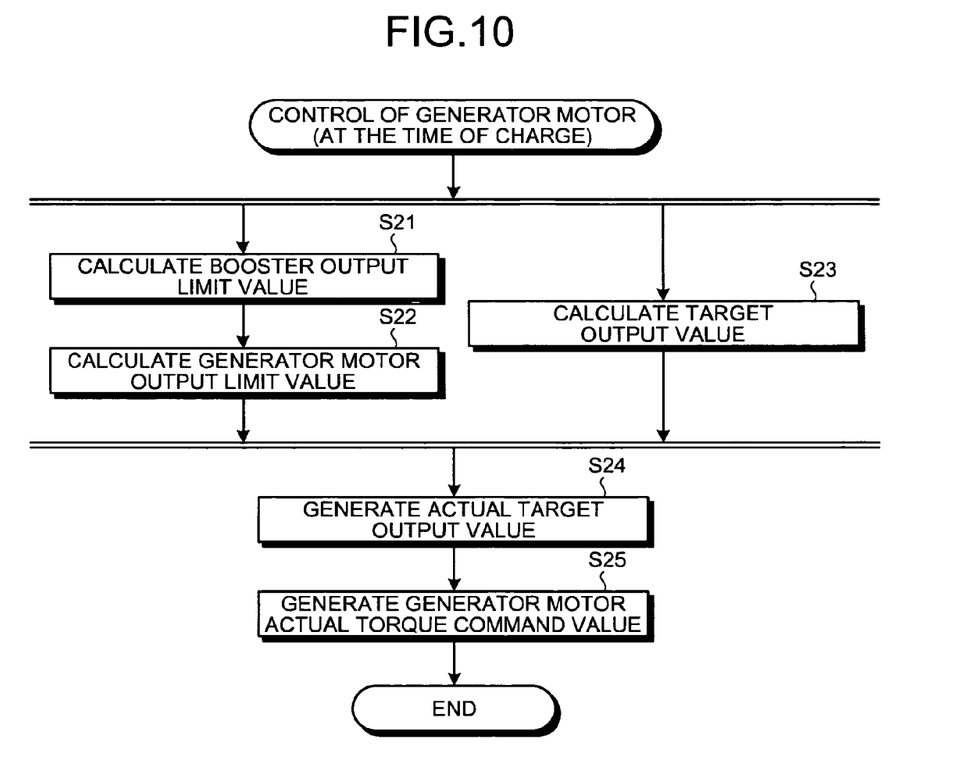
FIG. 10 is a flowchart showing an overview of the control of the generator motor at the time of charge of the capacitor in the method of controlling the hybrid construction machine according to one embodiment of the present invention.
Figure 11:
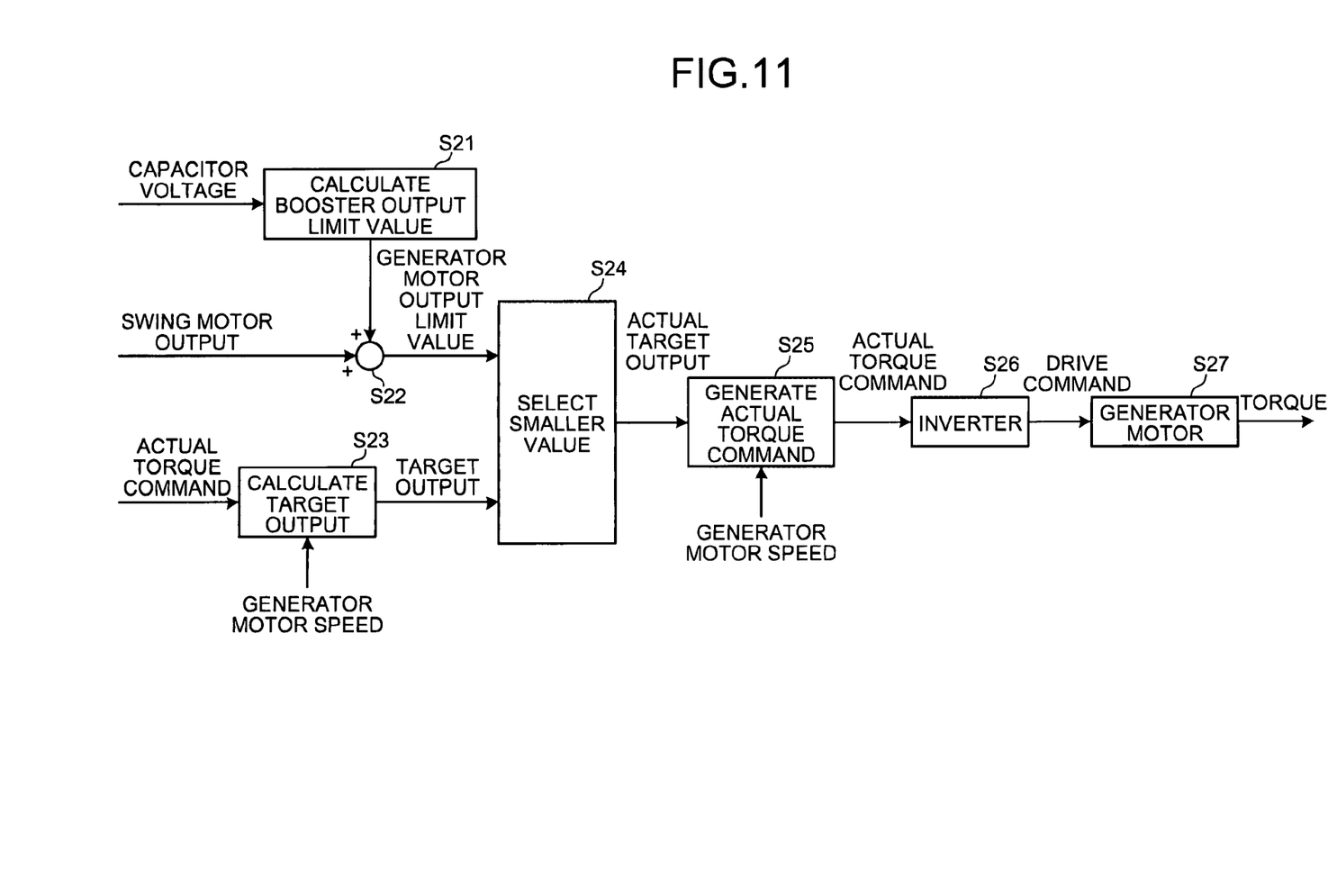
FIG. 11 is a process flow diagram showing the flowchart shown in FIG. 10 in more detail based on flow of signals.

FIG. 10 is a flowchart showing an overview of the control of the generator motor 3 at the time of charge of the capacitor. Also, FIG. 11 is a process flow diagram showing the flowchart shown in FIG. 10 in more detail based on flow of signals.

First, the controller 12 calculates the output limit value BstInPowLimit of the booster 8 corresponding to the capacitor voltage Vcap of the capacitor 6 measured by the voltage sensor 7 (step S21). The calculation at the step S21 is performed by referring to the curve L2 in FIG. 3.

After that, the controller 12 obtains a sum of the output limit value BstInPowLimit of the booster 8 obtained at the step S21 and an output of the swing motor 9 to output as an output limit value of the generator motor 3 (step S22). Meanwhile, the output of the swing motor 9 is defined to be negative at the time of regeneration.

The controller 12 calculates a target output value by using the actual torque command value and the measured value of the motor speed of the generator motor 3 in parallel with the processes at the steps S21 and S22 (step S23).

After that, the controller 12 reads the generator motor output limit value output at the step S2 and the target output value output at the step S23 from the memory 12a to compare with each other, selects a smaller value to generate an actual target output value, and outputs the actual target output value (step S24).

The controller 12 calculates the torque from the actual target output at the step S24 and the motor speed of the generator motor 3, and outputs the calculated torque as the actual torque command value (step S25).

The inverter 5, which receives the input of the actual torque command value from the controller 12, outputs the drive command to the generator motor 3 according to the actual torque command value (step S26). The generator motor 3 is driven based on the drive command output by the inverter 5 to generate the torque (step S27).

When the swing motor 9 is in a brake state (regeneration state), there is a possibility that the booster 8 enters an input state over the limit if the generator motor 3 is in a power generation state (regeneration state). In this embodiment, in order to prevent such an excessive input state, an amount of power generation of the generator motor 3 is limited in view of the input limit of the booster 8.

According to the above-described one embodiment of the present invention, it is possible to prevent the system from being rendered inoperative without increasing capacitance of the capacitor, by generating the actual torque command value by respectively referring to the torque limit value corresponding to the capacitor voltage of the generator motor and the swing motor at the time of discharge of the capacitor, and by generating the actual target output value of the generator motor at the time of charge of the capacitor.

Also, according to this embodiment, the actual torque command value (at the time of discharge of the capacitor) and the actual target output value (at the time of charge of the capacitor) of the generator motor are obtained in view of the output limit of the booster corresponding to the capacitor voltage, while the effect of the booster is small in the swing motor and only the torque is limited, so that delay of the swing operation relative to the operation command by the operator at the time of the swing operation may be inhibited. Therefore, the operator does not feel uncomfortable at the time of operation.

Although the best mode for carrying out the present invention is described so far, the present invention is not limited only by the above-described one embodiment. For example, it is also possible to individually separately perform the control of the generator motor and the control of the swing motor.

In addition, it is also possible to control the generator motor individually separately at the time of charge of the capacitor and the control at the time of discharge of the capacitor.

In this manner, the present invention may include various embodiments not described herein, and it is possible to make various design changes or the like without departing from the scope of technical idea specified by claims.

INDUSTRIAL APPLICABILITY

As described above, the present invention is useful when performing the control of the hybrid construction machine provided with the engine and the generator motor coupled to each other as the drive sources and provided with the capacitor as the storage device and the swing motor to which the electric power is supplied from the generator motor and the capacitor.

The invention claimed is:

1. A method of controlling a hybrid construction machine provided with an engine and a generator motor coupled to each other, a swing motor which electric power is supplied to from the generator motor for swinging a part of a body relative to other parts, a capacitor for storing the electric power generated by each of the generator motor and the swing motor and supplying the electric power to the generator motor and the swing motor, and a booster for boosting voltage of the capacitor to output, the method comprising:

an assist torque limit value calculating step of calculating an assist torque limit value of the generator motor corresponding to capacitor voltage of the capacitor when the booster performs an output associated with discharge of the capacitor;

a generator motor torque command value calculating step of calculating a torque command value of the generator motor according to a target speed of the generator motor; and a generator motor actual torque command value generating step of comparing the assist torque limit value calculated at the assist torque limit value calculating step with the torque command value calculated at the generator motor torque command value calculating step, and generating an actual torque command value of the generator motor by using the smaller of the assist torque limit value and the torque command value.

2. The method of controlling the hybrid construction machine according to claim 1, wherein the assist torque limit value is zero when the capacitor voltage is not larger than a first threshold, and gradually increases as the capacitor voltage becomes larger than the first threshold to take a constant value when the capacitor voltage is not smaller than a second threshold larger than the first threshold.

3. The method of controlling the hybrid construction machine according to claim 1, wherein in the generator motor torque command value calculating step, the torque command value of the generator motor is calculated by performing proportional control, in which an actual speed of the generator motor is fed back.

4. The method of controlling the hybrid construction machine according to claim 1, further comprising:

a swing power running torque limit value calculating step of calculating a swing power running torque limit value of the swing motor corresponding to the capacitor voltage when the booster performs the output associated with the discharge of the capacitor;

a swing motor torque command value calculating step of calculating a torque command value of the swing motor according to a target speed of the swing motor; and a swing motor actual torque command value generating step of comparing the swing power running torque limit value calculated at the swing power running torque limit value calculating step with the torque command value calculated at the swing motor torque command value calculating step and generating an actual torque command value of the swing motor by using the smaller of the swing power running torque limit value and the torque command value.

5. The method of controlling the hybrid construction machine according to claim 4, wherein the swing power running torque command value is zero when the capacitor voltage is not larger than a third threshold, which is smaller than the first threshold, and gradually increases as the capacitor voltage becomes larger than the third threshold to take a constant value when the capacitor voltage is not smaller than a fourth threshold, which is larger than the third threshold.

6. The method of controlling the hybrid construction machine according to claim 4, wherein in the swing motor torque command value calculating step, the torque command value of the swing motor is calculated by performing proportional control, in which an actual speed of the swing motor is fed back.

7. The method of controlling the hybrid construction machine according to claim 1, comprising:

a booster output limit value calculating step of calculating an output limit value of the booster corresponding to the capacitor voltage when the booster performs an output associated with charge of the capacitor;

a generator motor output limit value calculating step of calculating an output limit value of the generator motor by using the output limit value calculated at the booster output limit value calculating step and an output of the swing motor;

an actual target output value generating step of comparing the output limit value of the generator motor calculated at the generator motor output limit value calculating step with a target output value of the generator motor and generating an actual target output value of the generator motor by using the smaller of the output limit value of the generator motor and a target output value of the generator motor; and a charge time generator motor actual torque command value generating step of generating the actual torque command value of the generator motor by using the actual target output value generated at the actual target output value generating step and a motor speed of the generator motor.

8. A hybrid construction machine provided with an engine and a generator motor coupled to each other, a swing motor which electric power is supplied to from the generator motor for swinging a part of a body relative to other parts, a capacitor for storing the electric power generated by each of the generator motor and the swing motor and supplying the electric power to the generator motor and the swing motor, and a booster for boosting voltage of the capacitor to output, comprising:

a capacitor voltage measuring unit for successively measuring capacitor voltage of the capacitor; and a controlling unit for calculating an assist torque limit value of the generator motor corresponding to the capacitor voltage measured by the capacitor voltage measuring unit, while calculating a torque command value of the generator motor according to a target speed of the generator motor, and for comparing the assist torque limit value with the torque command value of the generator motor, and generating an actual torque command value of the generator motor to output by using the smaller of the assist torque limit value and the torque command value of the generator motor, when the booster performs an output associated with discharge of the capacitor.

9. The hybrid construction machine according to claim 8, wherein the controlling unit, while calculating a swing power running torque limit value of the swing motor corresponding to the capacitor voltage measured by the capacitor voltage measuring unit, calculates a torque command value of the swing motor according to a target speed of the swing motor, compares the swing power running torque limit value with the torque command value of the swing motor, and generates an actual torque command of the swing motor to output by using the smaller of the swing power running torque limit value and the torque command value of the swing motor, when the booster performs the output associated with the discharge of the capacitor.

10. The hybrid construction machine according to claim 8, wherein the controlling unit calculates an output limit value of the booster corresponding to the capacitor voltage measured by the capacitor voltage measuring unit, obtains an output limit value of the generator motor by using the calculated output limit value and the output of the swing motor, compares the output limit value with a target output value of the generator motor, and generates an actual target output value of the generator motor to output by using a smaller of the output limit value and a target output value of the generator motor, when the booster performs an output associated with charge of the capacitor.

11. A method of controlling a hybrid construction machine comprising an engine, a swing motor for swinging a part of a body relative to other parts, and a capacitor for storing the electric power generated by the swing motor and supplying the electric power to the swing motor, the method comprising:

a swing power running torque limit value calculating step of calculating a swing power running torque limit value of the swing motor corresponding to the capacitor voltage;

a swing motor torque command value calculating step of calculating a torque command value of the swing motor according to a target speed of the swing motor; and a swing motor actual torque command value generating step of comparing the swing power running torque limit value calculated at the swing power running torque limit value calculating step with the torque command value calculated at the swing motor torque command value calculating step and generating an actual torque command value of the swing motor by using the smaller of the swing power running torque limit value and the torque command value.

* * * * *